No. 872,816. PATENTED DEC. 3, 1907.
B. HEMANN & A. GUENTHER.
NUT LOCK OR FASTENING DEVICE.
APPLICATION FILED DEC. 13, 1906.
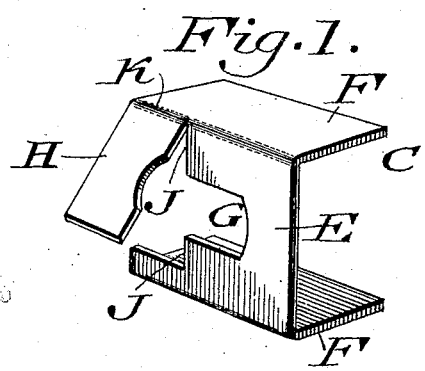
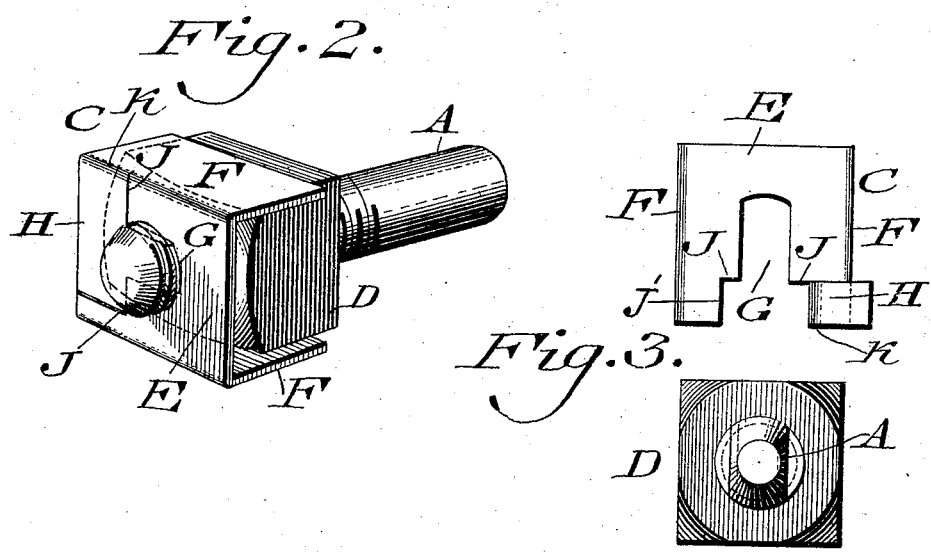
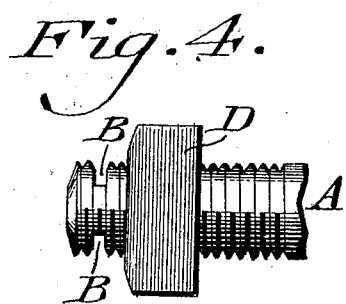
Witnesses
P. F. Nagle.
L. Douville.
Inventors.
Bernard Hemann.
Albert Guenther
By Diederstein + Fairbanks
Attorneys

UNITED STATES PATENT OFFICE.

BENNARD HEMANN AND ALBERT GUENTHER, OF BELLEVILLE, ILLINOIS.

NUT LOCK OR FASTENING DEVICE.

No. 872,816.          Specification of Letters Patent.          Patented Dec. 3, 1907.

Application filed December 13, 1906. Serial No. 347,717.

*To all whom it may concern:*

Be it known that we, BENNARD HEMANN and ALBERT GUENTHER, citizens of the United States, residing at Belleville, in the county of St. Clair, State of Illinois, have invented a new and useful Nut Lock or Fastening Device, of which the following is a specification.

Our invention consists of a nut lock or fastening device, composed of a body adapted to be fitted on a bolt and embrace the nut so as to prevent unscrewing of the latter, and a member adapted to engage with the side of the bolt, so as to prevent displacement of the device.

Figure 1 represents a perspective view of a nut lock or fastening device embodying our invention. Fig. 2 represents a perspective view of the same in position. Fig. 3 represents a front view of the device separated from the nut and bolt. Fig. 4 represents a side elevation of portion of a bolt and the nut to which the device is applied.

Similar letters of reference indicate corresponding parts in the figures.

Referring to the drawings: A designates a bolt, the same having thereon on opposite sides near its terminal the transversely extending grooves or recesses B, the same breaking the continuity of the threads of the bolt. C designates the lock or fastening device for the nut D, which is placed upon the bolt as usual, said device being formed of a suitable plate or sheet of wrought metal, and composed of the front face E, the side flanges F, the recess or passage G, and the pliable or somewhat resilient tongue H, the latter being formed by cutting the front face on the lines J, J' turning out said tongue, the bend K of the latter acting after the manner of a hinge, said line J bisecting the recess G, so that when said tongue is turned out, the adjacent end of said recess is uncovered.

The operation is as follows, the parts being in position shown in Figs. 1 and 3: The nut is screwed on the bolt to the required extent, when the device is then placed so as to be presented to the same as best illustrated in Fig. 3 and then moved over the nut while the recess G receives the adjacent portion of the bolt outside of the nut, it being noticed that the walls of said recess enter the grooves B, thus straddling the bolt, while the flanges F straddle the nut, thus providing a barrier or abutment for the nut by which the latter is restrained and so cannot unscrew itself or be unscrewed, it thus being reliably locked or fastened, but in order to prevent the device from leaving its position or be improperly displaced, the tongue H is forced or bent towards the nut, when owing to its pliable or resilient nature, it rides past the end of the bolt and then seats itself at the side of the bolt and may interlock with a thread of the latter if so desired, thus holding the device immovably on the bolt, the effect of which is evident as fully illustrated in Fig. 2.

When it is desired to unscrew the nut for any purpose, the tongue is forced or bent outwardly by any suitable implement, whereby it leaves the shank of the bolt with which it was engaged when the recess G is again uncovered, and so the device may be slidingly removed from the bolt and nut, leaving the latter accessible to be further tightened or unscrewed, and the bolt to be displaced if so desired.

The outer portion of the tongue H projects sufficiently beyond the adjacent side of the nut as illustrated by the dotted lines, Fig. 2, so that when required it may be grasped by an implement in order to be conveniently removed from the thread of the bolt and bent outwardly to the position shown in Fig. 1.

In Fig. 3, we show the end of the shank of the bolt flattened on opposite places without producing different results from that shown in Fig. 2.

Having thus described our invention, what we claim as new and desire to secure by Letters Patent, is:—

1. A nut fastening device comprising a body provided with a flange adapted to embrace the side of a nut, a passage in said body having its walls adapted to straddle the shank of a bolt on which the nut is fitted to prevent unscrewing of the nut, and a pliable tongue on said body adapted to close said passage and engage said shank, the several members of the device as named being integral.

2. A nut fastening device comprising a body provided with a flange adapted to embrace the side of a nut, a passage in said body having its walls adapted to straddle the shank of a bolt on which the nut is fitted to prevent unscrewing of the nut, and a pliable tongue on said body adapted to close said passage and engage said shank, the several members of the device as named being integral, said shank having in its side a recess which is adapted to receive the walls of said passage.

BENNARD HEMANN.
ALBERT GUENTHER.

Witnesses:
  W. F. KIRCHER,
  WM. M. HOPPE.